W. M. BELL.
LOCK FOR MOTOR VEHICLES.
APPLICATION FILED MAR. 31, 1916.

1,272,192.

Patented July 9, 1918.

Witnesses

Inventor
W. M. Bell,
By Victor J. Evans
Attorney

UNITED STATES PATENT OFFICE.

WILLIAM M. BELL, OF CHARLOTTE, NORTH CAROLINA.

LOCK FOR MOTOR-VEHICLES.

1,272,192.     Specification of Letters Patent.     Patented July 9, 1918.

Application filed March 31, 1916. Serial No. 88,156.

*To all whom it may concern:*

Be it known that I, WILLIAM M. BELL, a citizen of the United States, residing at Charlotte, in the county of Mecklenburg and State of North Carolina, have invented new and useful Improvements in Locks for Motor-Vehicles, of which the following is a specification.

This invention relates to locks for motor vehicles, the object in view being to provide simple and reliable means of attractive appearance applicable to any automobile or like vehicle and directly associated with the clutch lever in order that said lever may be locked in a certain position where it will prevent the unauthorized use of the vehicle by persons other than the owner or operator thereof.

With the above and other objects in view, the invention consists in the novel construction, combination and arrangement of parts, as herein described, illustrated and claimed.

In the accompanying drawings:—

Figure 1:
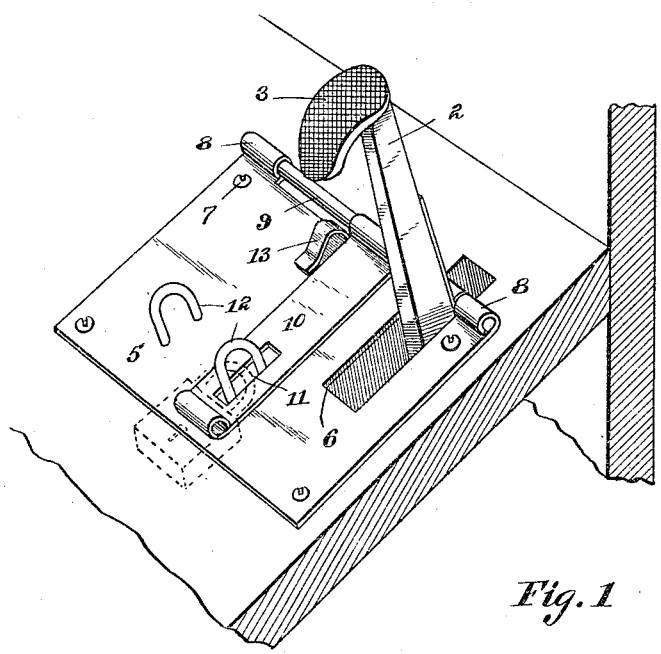
Figure 1 is a fragmentary perspective view of a sufficient part of the floor of a motor vehicle to illustrate the applied relation of this invention thereto.
Figure 2:
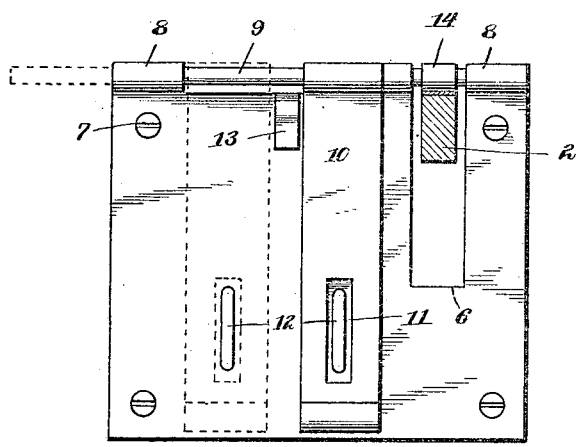
Fig. 2 is a plan view of the locking device, *per se*.

Referring to the drawings 1 designates the floor of a vehicle which is usually inclined. 2 represents the clutch lever provided with the usual clutch pedal 3 at the upper end thereof, and 4 designates the slot through the floor to admit of the back and forth movement of the clutch lever.

In carrying out the present invention, I employ a floor plate 5 which is formed with a slot 6 to register with the slot 4 in the floor and admit of the necessary fore and aft movement of the clutch lever 2.

The plate 5 is shown as fastened in fixed relation to the floor 1 by means of screws 7 or the equivalent thereof. Along one edge, the plate 5 is provided with a plurality of knuckles 8, two of these knuckles being arranged at opposite sides of the patch of movement of the clutch lever. A slidable bolt 9 passes through the knuckles 8 and is provided with an arm 10 having a rigid connection therewith by means of which the shaft 9 may be rocked in the knuckles 8. The arm 10 is shown as provided with a slot 11 to receive either one of a pair of eyes 12 fastened to and extending upwardly from the floor plate 5.

The floor plate is further provided with a two way stop 13 adapted to hold the arm 10 in either one of two positions. Either one of the eyes 11 is adapted to receive a pad lock. The lever 2 is preferably provided with an eye 14 thereon through which the bolt 9 is adapted to be inserted, this being particularly desirable with certain types of clutch levers particularly those used in connection with machines having what is known as the friction drive.

From the foregoing description, taken in connection with the accompanying drawings it will now be understood that the plate 5 is fastened to the floor 1 of the vehicle. When the clutch lever is free for operation, the arm 10 is arranged at one side of the stop 13 and is in engagement with the adjacent eye 12 where it may be either fastened by the pad lock or left loose at it is held over the eye by gravity. When it is desired to lock the clutch lever, the arm 10 is rocked upwardly until it will pass over the stop 13. The shaft 9 is then slid into engagement with the eye of the clutch lever 2 until the arm 10 has reached the opposite side of the stop 13 when said arm is moved downward over the other eye 12 which receives the pad lock.

I do not desire to be limited to the use of the hasp eye and pad lock fastening means, as it will be apparent that the arm 10 may be locked to the plate 5 by other locking means such as the lock now ordinarily and commonly used in connection with trunks and the like.

I claim:—

In a lock of the class set forth, a floor plate formed with an open ended slot to receive and admit of the fore and aft movement of a vehicle control lever, knuckles extending upwardly from said floor plate at opposite sides of said slot, a locking bolt slidable at a right angle to and across said slot through said knuckles to obstruct the movement of said lever, an arm on said bolt movable toward and away from the floor plate, and lock receiving means coöperating with said arm, to prevent movement of said bolt at both limits of the sliding movement of the latter.

In testimony whereof I affix my signature in presence of two witnesses.

WILLIAM M. BELL.

Witnesses:
HOWARD L. HOPKINS,
JUNIUS M. SMITH.

Copies of this patent may be obtained for five cents each, by addressing the "Commissioner of Patents, Washington, D. C."